(12) United States Patent
Zheng et al.

(10) Patent No.: US 11,897,982 B2
(45) Date of Patent: Feb. 13, 2024

(54) WATER-BASED POLYMER DISPERSIONS AND USES THEREOF

(71) Applicants: WACKER CHEMIE AG, Munich (DE); Jin Zheng, Shanghai (CN)

(72) Inventors: Jin Zheng, Shanghai (CN); Lingyun Huang, Shanghai (CN); Yun Li, Shanghai (CN); Haoqing Sun, Shanghai (CN); Jiyang Zhang, Shanghai (CN)

(73) Assignee: Wacker Chemie AG, Munich (DE)

( * ) Notice: Subject to any disclaimer, the term of this patent is extended or adjusted under 35 U.S.C. 154(b) by 854 days.

(21) Appl. No.: 16/969,684

(22) PCT Filed: Feb. 13, 2018

(86) PCT No.: PCT/CN2018/076615
§ 371 (c)(1),
(2) Date: Aug. 13, 2020

(87) PCT Pub. No.: WO2019/157620
PCT Pub. Date: Aug. 22, 2019

(65) Prior Publication Data
US 2021/0002402 A1 Jan. 7, 2021

(51) Int. Cl.
| | | |
|---|---|---|
| *C08F 220/28* | (2006.01) |
| *C04B 24/26* | (2006.01) |
| *C04B 40/00* | (2006.01) |
| *C08L 29/04* | (2006.01) |
| *C08L 33/14* | (2006.01) |
| *C08L 33/26* | (2006.01) |
| *C08L 71/02* | (2006.01) |

(52) U.S. Cl.
CPC ...... *C08F 220/285* (2020.02); *C04B 24/2623* (2013.01); *C04B 24/2647* (2013.01); *C04B 24/2652* (2013.01); *C04B 40/0039* (2013.01); *C08L 29/04* (2013.01); *C08L 33/14* (2013.01); *C08L 33/26* (2013.01); *C08L 71/02* (2013.01); *C08L 2201/50* (2013.01); *C08L 2201/54* (2013.01); *C08L 2205/035* (2013.01)

(58) Field of Classification Search
CPC ............. C08F 220/285; C04B 24/2623; C04B 24/2647; C04B 24/2652; C04B 40/0039; C08L 29/04; C08L 33/14; C08L 33/26; C08L 71/02
See application file for complete search history.

(56) References Cited

U.S. PATENT DOCUMENTS

| | | |
|---|---|---|
| 4,402,752 A | 9/1983 | Chesney |
| 6,359,040 B1 | 3/2002 | Burdick |
| 8,846,784 B2 | 9/2014 | Gaberlein et al. |
| 2015/0184015 A1 | 7/2015 | Mclennan et al. |

FOREIGN PATENT DOCUMENTS

| | | |
|---|---|---|
| CN | 101050341 B | 6/2011 |
| CN | 103936339 A | 7/2014 |
| CN | 104470960 A | 3/2015 |
| CN | 106634350 A | 5/2017 |
| JP | 60016849 A | 1/1985 |
| WO | 2014023015 A1 | 2/2014 |

*Primary Examiner* — Edward J Cain
(74) *Attorney, Agent, or Firm* — BROOKS KUSHMAN P.C.

(57) ABSTRACT

Vinyl ester/ethylene copolymer aqueous dispersions containing an anionic polyacrylamide, at least one polyvinyl alcohol, and optionally a non-ionic surfactant, are useful in cementitious compositions as polymer additives.

16 Claims, No Drawings

WATER-BASED POLYMER DISPERSIONS AND USES THEREOF

CROSS REFERENCE TO RELATED APPLICATIONS

This application is the U.S. National Phase of PCT Appln. No. PCT/CN2018/076615 filed Feb. 13, 2018, the disclosure of which is incorporated in its entirety by reference herein.

BACKGROUND OF THE INVENTION

1. Field of the Invention

The present invention relates to water-based polymer dispersions and uses thereof, in particular to vinyl ester-ethylene copolymer dispersions and their use as a liquid ingredient in polymer modified cement-based coatings.

2. Description of the Related Art

Polymer modified cement-based coatings are two-component water-based waterproofing coatings that have emerged in recent years. As defined in GB/T 23445-2009, polymer modified cement-based coatings are divided into Type I, Type II and Type III according to physical-mechanical properties, wherein Type II (also called "JS II") has a lower polymer/cement ratio compared with Type I (also called "JS I"), which can not only improve the water resistance and weatherability of the coatings, but also have cost advantage, making Type II gradually more popular in the market. However, due to the reduced polymer/cement ratio, Type II polymer modified cement-based coatings are prone to sagging after being applied on facades, making it difficult to balance pot life and anti-sagging properties, and to simultaneously meet the demands of users or consumers for tensile strength and elongation at break, in particular a significantly reduced elongation at break.

CN104470960A discloses a Type II polymer modified cement-based coating composition comprising a vinyl ester-ethylene copolymer dispersion wherein the comonomers are polymerized in the presence of at least one medium molecular weight polyvinyl alcohol and at least one low molecular weight polyvinyl alcohol. The mass ratio of liquid component to powder component of the Type II formulation is 1:1.2, wherein the liquid component comprises 800 parts of a vinyl acetate-ethylene copolymer dispersion (having a solid content of about 55 wt %), 2 parts of a wetting agent, 3 parts of a cellulose thickener and 195 parts of water, while the powder component comprises 300 parts of Portland cement (42.5), 200 parts of calcium carbonate (325#), 200 parts of quartz sand (200 #) and 300 parts of quartz sand (80-120 #). Although WO2014023015 discloses that the Type II formulation has higher tensile strength and elongation at break, its anti-sagging property and pot life are not studied.

CN103936339A discloses a Type II polymer modified cement-based waterproofing coating with a mass ratio of liquid component to powder component being 1:1.2, wherein the liquid component comprises 75-85% of a vinyl acetate-ethylene copolymer dispersion, 3.5-10% of a plasticizer, 0.05-0.25% of a starch ether, 0.83-1.18% of mixed acetic acid esters and 10-14% of water, while the powder component comprises 25-35% of a cement, 15-25% of quartz flour, 45-55% of wollastonite powder and 0.05-0.2% of a water reducer. The Type II coating has an improved anti-sagging property by the addition of starch ether and mixed acetic acid esters into the formulation, a tensile strength of from 2.51 to 2.75 MPa, and an elongation at break of from 105 to 113%, but its pot life is not disclosed.

SUMMARY OF THE INVENTION

Water-based polymer dispersions of in the present invention can be used to at least solve the above-mentioned problem that Type II polymer modified cement-based coatings are prone to sagging after applied on facades, and further to ensure an ideal balance between pot life and anti-sagging property, and even to meet the demands of users or consumers for tensile strength and elongation at break.

One first aspect of the present invention provides a water-based polymer dispersion comprising the following ingredients:
i) a copolymer prepared by the polymerization of comonomers including a vinyl ester and ethylene,
ii) anionic polyacrylamide,
iii) polyvinyl alcohol, and
iv) water,
wherein the anionic polyacrylamide is typically used in an amount of at least 0.15 wt %, based on the total weight of the vinyl ester and ethylene monomers.

DETAILED DESCRIPTION OF THE PREFERRED EMBODIMENTS

According to the invention, the proportion of the vinyl ester in the vinyl ester/ethylene copolymer is typically from 70 to 95 wt %, for example, from 75 to 90 wt %, and the proportion of ethylene is typically from 5 to 30 wt %, for example, from 10 to 25 wt %, based on the total weight of the vinyl ester and ethylene monomers.

According to the invention, the vinyl ester can be, for example, vinyl acetate, vinyl butyrate, vinyl propionate, vinyl pivalate, vinyl 2-ethylhexanoate, 1-methyl vinyl acetate, vinyl laurate or any combination of these vinyl alkyl esters, but are not limited thereto. Preference is given to vinyl acetate.

Anionic Polyacrylamide

As used herein, the term "anionic polyacrylamide" refers to polymers having a

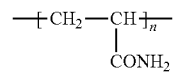

molecular chain with a structural unit and generating hydrophilic anions upon dissociation in water.

According to the invention, the molecular weight of the anionic polyacrylamide is suitably from $1\times10^5$ to $1\times10^7$ g/mol, for example, $1\times10^5$ g/mol, $5\times10^5$ g/mol, $1\times10^6$ g/mol, $5\times10^6$ g/mol or $1\times10^7$ g/mol, preferably $1\times10^5$ to $1\times10^6$ g/mol. As used herein, the term "molecular weight" refers to number average molecular weight (Mn), unless otherwise specified.

According to the invention, typical examples of the anionic polyacrylamide include carboxylated polyacrylamide, but are not limited thereto. In some embodiments of the invention, the anionic polyacrylamide, having a molecular chain with a structural unit of

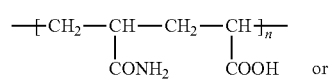

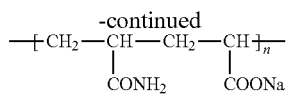

and a molecular weight of from $1 \times 10^5$ to $2 \times 10^5$ g/mol, is obtained by copolymerizing acrylamide with acrylic acid or sodium acrylate. It can be used in the form of a dry powder or dispersion, preferably in the form of a dispersion that typically has a solid content of from 20 to 50 wt %, for example, from 25 to 35 wt %. The dispersion can also be commercially available, such as TP-1800 supplied by Zhuzhou Rubber Research & Design Institute Co., Ltd. of ChemChina.

According to the invention, the anionic polyacrylamide can be used in an amount of at least 0.15 wt %, preferably 0.15 to 0.45 wt %, for example, 0.15 wt %, 0.2 wt %, 0.25 wt %, 0.3 wt %, 0.35 wt %. 0.4 wt % or 0.45 wt %, based on the total weight of the vinyl ester and ethylene monomers. If the amount of anionic polyacrylamide used is too low, the Type II polymer modified cement-based coatings obtained cannot achieve good anti-sagging property; while a too high amount of anionic polyacrylamide will lead to a significantly increased viscosity of the coating system, which is not conducive to the subsequent application and will raise the cost.

Nonionic Surfactant

According to the invention, the water-based polymer dispersions can comprise a nonionic surfactant to further stabilize powder particles such as cement to prolong the pot life of the polymer modified cement-based coatings. Typical nonionic surfactants are ethoxylated nonionic surfactants, including alkyl alcohol ethoxylates and ethylene oxide-propylene oxide copolymers, preferably ethoxylated nonionic surfactants with an HLB value of from 13 to 20.

The alkyl alcohol ethoxylate surfactants include linear alkyl alcohol ethoxylates and branched alkyl alcohol ethoxylate surfactants, wherein the alkyl suitably has 4 to 40 carbon atoms, preferably 10 to 20 carbon atoms, and is ethoxylated by preferably 10 to 60 EO units, more preferably 30 to 50 EO units. Suitable alkyl alcohol ethoxylate surfactants include $C_{12}$-$C_{14}$, fatty alcohols having 30 to 50 EO units, $C_{13}$-$C_{15}$ fatty alcohols having 30 to 50 EO units, $C_{16}$-$C_{18}$ fatty alcohols having 30 to 50 EQ units, $C_{10}$ or $C_{13}$ fatty alcohols having 30 to 50 EO units.

The EO-PO copolymer surfactants can be selected from EO-PO copolymers having 10 to 60 EO units, preferably 30 to 50 EO units, and a molar mass of from 500 to 3,000.

According to the invention, the nonionic surfactants can be used in an amount of less than 1 wt %, preferably from 0.2 to 0.8 wt %, for example, 0.2 wt %, 0.3 wt %, 0.4 wt %, 0.5 wt %, 0.6 wt %. 0.7 wt % or 0.8 wt %, based on the total weight of the vinyl acetate and ethylene monomers.

Polyvinyl Alcohol

According to the invention, the polyvinyl alcohols can be medium molecular weight polyvinyl alcohols, low molecular weight polyvinyl alcohols, or a combination thereof, and preferably comprise at least one medium molecular weight polyvinyl alcohol and at least one low molecular weight polyvinyl alcohol to reduce the processing viscosity and better meet the standard requirements for the tensile strength and elongation at break of the polymer modified cement-based coatings.

As used herein, the term "medium molecular weight polyvinyl alcohol" refers to polyvinyl alcohols having a Höppler viscosity, in 4 wt % aqueous solution, of from 10 to 35 mPa·s as measured at 20° C. according to DIN 53015. The term "low molecular weight polyvinyl alcohol" herein refers to polyvinyl alcohols having a Höppler viscosity, in 4 wt % aqueous solution, of from 3 to less than 10 mPa·s as measured at 20° C. according to DIN 53015. Typically, the medium molecular weight polyvinyl alcohols have a degree of hydrolysis of from 85 to 99 mol % and the low molecular weight polyvinyl alcohols have a degree of hydrolysis of from 75 to 90 mol %.

Suitable medium molecular weight polyvinyl alcohols can be PVOH 25/88 and / or PVOH 117. but are not limited thereto. Suitable low molecular weight polyvinyl alcohols can be PVOH 04/88, but not limited thereto.

According to the invention, suitable amounts of the polyvinyl alcohols can be from 2 to 8 wt %, preferably from 2 to 6 wt %, for example, 2 wt %, 3 wt %, 4 wt %, 5 wt % or 6 wt %, based on the total weight of the vinyl ester and ethylene monomers. Where the polyvinyl alcohols comprise at least one medium molecular weight polyvinyl alcohol and at least one low molecular weight polyvinyl alcohol, the mass ratio of the former to the latter is preferably 0.6 to 2.5:1, more preferably 0.6 to 2:1, for example, 0.6:1, 0.8:1, 1:1, 1.3:1, 1.5:1. 1.7:1 or 2:1.

In certain embodiments of the invention, the polyvinyl alcohols comprise one medium molecular weight polyvinyl alcohol and one low molecular weight polyvinyl alcohol, wherein the former has a degree of hydrolysis of from 85 to 99 mol %, and the latter has a degree of hydrolysis of from 75 to 90 mol %, and the mass ratio of the former to the latter is 0.6 to 0.8:1.

In other embodiments of the invention, the polyvinyl alcohols comprise two medium molecular weight polyvinyl alcohols and one low molecular weight polyvinyl alcohol, wherein the first medium molecular weight polyvinyl alcohol has a degree of hydrolysis of from 85 to 95 mol % and a Höppler viscosity, in 4 wt % aqueous solution, of from 20 to 30 mPa·s as measured at 20° C. according to DIN 53015, the second medium molecular weight polyvinyl alcohol has a degree of hydrolysis of from 95 to 99 mol % and a a Höppler viscosity, in 4 wt % aqueous solution, of from 10 to less than 20 mPa·s as measured at 20° C. according to DIN 53015, the low molecular weight polyvinyl alcohol has a degree of hydrolysis of from 75 to 90 mol %, and the mass ratio of the two medium molecular weight polyvinyl alcohols to the low molecular weight polyvinyl alcohol is 1.5 to 2:1.

Redox Initiator

According to the invention, the copolymerization is initiated by a redox initiator. Suitable oxidizing agents can be one or more members selected from a group consisting of sodium persulfate, potassium persulfate, ammonium persulfate, hydrogen peroxide, t-butyl peroxides (e.g., t-butyl hydroperoxide), potassium peroxodisulfate, t-butyl peroxypivalate, cumyl hydroperoxide and azobisisobutyronitrile, preferably one, or a combination, of sodium persulfate, potassium persulfate, ammonium persulfate, hydrogen peroxide and t-butyl peroxide. According to the invention, the oxidizing agent is suitably used in an amount of from 0.1 to 2 wt %, preferably from 0.2 to 1 wt %, based on the total weight of the vinyl ester and ethylene monomers.

Suitable reducing agents are one or more members selected from a group consisting of alkali metal or ammonium sulfites, bisulfites (e.g. sodium sulfite), derivatives of sulfoxylates (e.g. formaldehyde-zinc sulfoxylate or formaldehyde-sodium sulfoxylate), sulfinic acid or salts thereof (e.g. 2-hydroxy-2-sulfinatoacetate, disodium 2-hydroxy-2-sulfinatoacetate, zinc 2-hydroxy-2-sulfinatoacetate, or disodium 2-hydroxy-2-sulfinopropionate), ascorbic acid or salts thereof (e.g. sodium ascorbate), isoascorbic acid or salts thereof (e.g. sodium erythorbate) and tartaric acid, preferably one or more members selected from among sulfinic acid or salts thereof, ascorbic acid or salts thereof and isoascorbic acid or salts thereof. The sulfinic acids or salts thereof can also be commercially available, for example, Bruggolite® FF6, Bruggolite® FF6M or Bruggolite® FF7 supplied by BrüggemannChemical, Germany. According to the invention, the reducing agent is suitably used in an amount of from 0.02 to 2 wt %, preferably from 0.05 to 1 wt %, based on the total weight of the vinyl ester and ethylene monomers.

Other Comonomers

In order to extend the polymer's properties, in addition to the vinyl ester and ethylene monomers, other comonomers can also be present during the polymerization, for example, halogenated ethers such as vinyl chloride; olefins such as propylene; ethylenically unsaturated carboxylic acids and their derivatives such as fumaric acid, maleic anhydride, maleic anhydride, acrylamide and acrylonitrile; pre-crosslinked comonomers or post-crosslinked comonomers such as divinyl adipate, diallyl maleate, allyl methacrylate, triallyl cyanurate, acrylamide glycolic acid (AGA), methyl methacrylamidate (MAGME), N-methylol acrylamide (NMA), N-methylol methacrylamide (NMMA), N-methylol allyl carbamate, isobutoxy ethers or esters of N-methylol acrylamide, isobutoxyl ethers or esters of N-methylol methacrylamide, isobutoxy ethers or esters of N-methylol allyl carbamate; epoxy functional comonomers such as glycidyl methacrylate (GMA) and glycidyl acrylate; and silicon-functional comonomers such as vinyltrialkoxysilane and vinylmethyldialkoxysilane.

According to the invention, other comonomers are preferably used in an amount of less than 10 wt %, for example, less than 5 wt %, less than 2 wt % or less than 1 wt %, based on the total weight of the vinyl ester and ethylene monomers.

According to the invention, the comonomers preferably comprise no other comonomers except vinyl ester and ethylene monomers, and more preferably vinyl acetate and ethylene monomers.

According to the invention, the water-based polymer dispersions typically have a solids content of from 50 to 60% wt % and a pH value of from 4 to 5.

A second aspect of the present invention provides a method for preparing the water-based polymer dispersions according to the first aspect of the invention, which can be a solution, dispersion or suspension polymerization process, preferably a dispersion polymerization process. The polymerization process can be divided into three stages: (1) prior to the initiation of the polymerization, (2) during polymerization, and (3) post-polymerization.

According to the invention, the stage prior to the initiation of the polymerization refers to the stage before the polymerization of monomers is initiated by an initiator. The post-polymerization stage refers to the stage where the reaction between the vinyl ester and ethylene monomers is mostly completed and the residual vinyl ester monomer content is less than 2 wt % (based on the total weight of the vinyl ester monomers), even less than 1 wt % or 5,000 ppm.

Prior to the initiation of the polymerization, the initial materials added to the reactor include:

i) at least part, suitably from 40 to 100 wt %, preferably from 50 to 85 wt %, of ethylene, based on the total amount thereof;

ii) at least part, suitably from 40 to 90% wt %, preferably from 30 to 85 wt %, of the vinyl ester, based on the total amount thereof: and optionally, iii) at least part, suitably at least 20 wt %, preferably at least 50 wt %, more preferably 100 wt %, of the polyvinyl alcohol, based on the total weight thereof.

In some embodiments of the invention, the initial materials prepared prior to the initiation of the polymerization comprise 50 to 80 wt % of the vinyl ester based on the total amount thereof, 50 to 75 wt % of ethylene based on the total amount thereof, and 100 wt % of polyvinyl alcohol.

Prior to the initiation of the polymerization, it is necessary to adjust the pH value of the initial materials, once prepared and charged into the reactor, to less than 6, preferably less than 5, more preferably from 3 to 4. An organic or inorganic acid, preferably phosphoric or formic acid, is commonly used to adjust the pH. A catalyst, such as ferrous ammonium sulfate, can also be usually added to the initial materials in the reactor to initiate and catalyze the polymerization reaction.

According to the invention, the polymerization is typically carried out at from 20 to 150° C., preferably from 50 to 120° C. The pressure in the reactor is usually stable during the polymerization, which is achieved by controlling the charge of ethylene, and can be set at different levels to meet the requirements of different formulations for the pressure. Suitable pressure during the polymerization is typically between 2 and 100 bar, preferably between 40 and 80 bar.

During the polymerization, the initial materials are usually heated to a temperature 10 to 40° C. lower than the desired temperature, and the reactor is further heated to the reaction temperature by the heat released from the polymerization reaction before the remaining monomers are metered and fed while the redox initiator is kept feeding. In some embodiments of the invention, feeding during the polymerization stage is carried out in four steps, where oxidants, reducing agents, the remaining vinyl ester, and the remaining ethylene are sequentially metered and fed, i.e. Feeding 1 to 4.

In order to avoid damaging the latex particles and thus affecting the progress of the polymerization reaction, the anionic polyacrylamide is preferably added after the polymerization is completed.

In order to prolong the pot life of the polymer modified cement-based coatings while ensuring anti-sagging property, the nonionic surfactant is preferably added after the polymerization is completed. The nonionic surfactant can also be added prior to the initiation of the polymerization. In this case however, the charge of the anionic polyacrylamide needs to be increased to avoid sagging, but this would cause a significant rise in the viscosity of the coatings, which is not conducive to the subsequent application and, due to a resulting cost increase, is not good for actual production. In some embodiments of the invention, the nonionic surfactant is added after the polymerization is completed, and the mass ratio of the nonionic surfactant to the anionic polyacrylamide is suitably 0.5 to 1.5:1. In other embodiments of the invention, the nonionic surfactant is added prior to the initiation of the polymerization, and the mass ratio of nonionic surfactant to anionic polyacrylamide is suitably 0.3 to 1.2:1.

According to the invention, defoamers can be optionally added to the dispersion after the vinyl ester-ethylene polymerization is completed. Suitable defoamers can be one, or a combination, of mineral oil-based defoamers, higher aliphatic alcohol-based defoamers, polyether-based defoamers and silicone-based defoamers, preferably mineral oil-based defoamers, wherein the mineral oil-based defoamers are defoamers with mineral oils (such as white oil, diesel or kerosene) as a carrier and hydrophobic substances (such as fatty acid/fatty acid metal soap, fatty acid amide and higher aliphatic alcohol) as an active defoaming ingredient. The defoamer can be used in an amount of less than 2 wt %, for example, less than 1 wt %, less than 0.5 wt % or less than 0.2 wt %, based on the total weight of the vinyl ester and ethylene monomers.

A third aspect of the invention provides uses of the water-based polymer dispersions according to the first aspect of the invention in polymer modified cement-based coatings.

As used herein, the term "polymer modified cement-based coating" refers to polymer modified cement-based waterproofing coatings as defined in the Chinese national standard GB/T 23445-2009, specifically to two-component water-based waterproofing coatings prepared with polymer dispersions and cements as main ingredients and additional fillers and other additives, which cure into a film through water evaporation and cement hydration reaction. Here, "two-component" means that the polymer modified cement-based coatings typically consist of a liquid component, usually comprising polymer dispersions and additives, and a powder component, usually comprising cements and fillers. The wording "polymer dispersions as the main ingredients" means that the proportion of polymer dispersions in the liquid component is at least 30 wt % or more, even more than 40 wt %, more than 50 wt %, more than 60 wt %, more than 70 wt %, or more than 80 wt %.

According to the invention, the water-based polymer dispersions are used as a liquid ingredient in polymer modified cement-based coatings, including Type I and Type II, especially Type II.

A fourth aspect of the invention provides a polymer cement coating that comprises liquid and powder components, wherein the liquid component comprises the abovementioned water-based polymer dispersions. and optionally water and other additives, and the powder component comprises cements, and optionally other fillers and additives.

Examples of the additives in the liquid component include plasticizers, defoamers and antifreezes, but are not limited thereto. Examples of the plasticizers include, but are not limited to: phthalate plasticizers, alkylsulfonate plasticizers, and polyether polyol plasticizers such as dibutyl phthalate, diisobutyl phthalate. dioctyl phthalate, diisodecyl phthalate, diisononyl phthalate, dioctyl adipate, diisodecyl adipate, dioctyl sebacate and dioctyl sebacate. Examples of the deformers include, but are not limited to: mineral oil defoamers, high-carbon alcohol defoamers, polyether defoamers and silicone-based defoamers such as Defoamer 1340, Defoamer A201 and Defoamer 1370. Examples of the antifreezes include, but are not limited to: propylene glycol and glycerol.

Examples of the cements include, but are not limited to: white cement and gray cement. A typical example of the white cements is white cement grade 32.5; and a typical example of the gray cements is gray cement grade 42.5. The particle size of fillers is typically from 100 to 500 mesh. Examples of suitable fillers include quartz powder, quartz sand, wollastonite powder and calcium carbonate, but are not limited thereto. Examples of the powder additives include cellulose ethers, and water reducers such as lignosulfonate water reducers, naphthalene super-plasticizers, melamine super-plasticizers, sulfamate super-plasticizers, fatty acid-based super-plasticizers, polycarboxylate super-plasticizers, but are not limited thereto.

Some embodiments of the invention provide a polymer modified cement-based coating, wherein the liquid component, based on the total weight thereof, comprises the following liquid ingredients in percent by weight: 75-92 wt % water-based polymer dispersions according to the first aspect of the invention, 5-12 wt % plasticizers, 0.4-1.5 wt % defoamers and 4-15 wt % water, the powder component, based on the total weight thereof, comprises the following ingredients in percent by weight: 40-60 wt % cements, 20-30 wt % calcium carbonate, 18-28 wt % quartz powder and 0.5-1.5 wt % water reducers, and a mass ratio of liquid component to powder component being 1:0.7 to 1.2 enables the polymer modified cement-based coating to meet the requirements of JS I, while a mass ratio of liquid component to powder component being 1: 1 to 1.2 enables the coating meet the requirements of JS II.

In addition to preparing polymer modified cement-based coatings, the water-based polymer dispersions herein, in combination with additives typically used to produce dispersion-based adhesives, can be used to produce adhesives. Suitable additives include, but are not limited to, coalescing agents such as toluene, white spirit, butylene glycol, butyl diglycol, butyl dipropylene glycol and butyl tripropylene glycol; plasticizers such as dimethyl phthalate, dibutyl phthalate, diisobutyl phthalate, dioctyl phthalate, diisodecyl phthalate, diisononyl phthalate, dioctyl adipate and diisodecyl adipate; wetting agents such as AMP® thickeners such as polyacrylates and polyurethanes; defoamers such as mineral oil defoamers and silicones defoamers; and UV stabilizers, such as Tinuvin 1130®.

The invention is further illustrated by the following examples, but the scope of the invention thereby. Any experimental methods with no conditions specified in the following examples are selected according to the conventional methods and conditions, or product specifications.

Inspection Method

1. Determination of Solids Content

The solids content of the water-based polymer dispersions herein refers to the ratio of the weight of the dispersions after drying to the weight of the same before drying. In the specific test method, a suitable amount (e.g. 1 to 2 g) of the water-based polymer dispersions are dried at 105° C. for several hours (e.g. 1 to 2 h) and then the result is obtained by calculating the ratio of the weight of the dried products to the weight of the dispersions before drying.

2. Preparation of Polymer Modified Cement-Based Coatings

Prepare Type I and Type II polymer modified cement-based coatings according to the formulation as shown in Table 1.

TABLE 1

|  | Ingredients (wt %) | JS I | JS II |
|---|---|---|---|
| Liquid component | Water-based polymer dispersion | 85 | 83 |
|  | dioctylphthalate | 8.5 | 7 |
|  | Defoamer 1370 | 0.5 | 1 |
|  | Water | 6 | 9 |
|  | Total | 100 | 100 |
| Powder component | Gray cement (Grade 42.5) | 50 | 50 |
|  | Calcium carbonate | 25 | 25 |
|  | Quartz powder | 24 | 24 |
|  | Sodium polycarboxylate super-plasticizer | 1 | 1 |
|  | Total | 100 | 100 |
|  | Mass ratio of liquid component to powder component | 1:0.8 | 1:1.2 |

L,M

The liquid ingredients and powder ingredients are respectively mixed according to the above mass ratios, and then the resulting liquid component and powder component are mixed according to the mass ratios in the above Table.

3. Determination of KU Viscosity

The KU viscosity of the polymer modified cement-based coatings herein is determined by using a Stormer Viscometer. In the specific test method, a suitable amount of powder component and liquid component are mixed for 5 minutes according to mixing ratio specified, left to stand for 1 to 3 minutes, and then transferred to a container, and the temperature of the coating obtained and the viscometer is maintained at 23±2° C.; the container is placed on a lifting tray, which is then adjusted to the correct position, and the rotor blades are immersed in the coating until the liquid level just reaches the mark of the rotor shaft, and the KU value of the coating can be directly read out from the Stormer Viscometer.

4. Anti-Sagging Test

The anti-sagging property of the polymer modified cement-based coatings is evaluated by observing the appearance of the coating film about half an hour after application. In the specific test method, a suitable amount of liquid component and powder component are weighed according to mixing ratio specified, stirred by machine for 10 minutes after mixed, and left to stand for 3 to 5minutes to reduce bubbles; the resulting mixture is then evenly applied by knife coating on a vertical, non-adsorptive plate with an area of about 1×1 m$^2$ to form an about 0.2 mm thick coating film; and the appearance of the film is observed after half an hour.

According to the invention, the rating criteria for anti-sagging property are shown in Table 2 below. The higher the score, the better the anti-sagging property.

TABLE 2

| Score | Appearance of coating film |
| --- | --- |
| 1 | Over 30% of the area of the coating film cracked |
| 2 | From 5% to 29% of the area of the coating film cracked |
| 3 | Less than 5% of the area of the coating film cracked |
| 4 | The coating film not obviously cracked, but fish scales shown on some parts |
| 5 | The coating film is intact with uniform thickness |

5. Determination of Pot Life

According to the invention, pot life refers to workability time during which the mixture of the liquid component and the powder component of the polymer modified cement-based coatings can be used. The wording "the mixture can be used" means such a state that the mixture of the liquid component and the powder component is not agglomerated and can still be stirred to form a slurry with good flow property. According to the invention, the pot life is determined at 23±2° C. and 50±10% relative humidity.

6. Tests for Tensile Strength and Elongation at Break of the Coating Film

The polymer modified cement-based coating film is prepared and its tensile strength and elongation at break are tested according to the Chinese national standard GB/T 23445-2009.

EXAMPLES 1-6 AND COMPARATIVE EXAMPLES 1-5

Water-Based Polymer Dispersions were Prepared According to the Following Process:

Prior to the Initiation of the Polymerization:

Preparation of the initial reactor charge: an aqueous solution was prepared by adding polyvinyl alcohol, ammonium ferrous sulfate and, if any, nonionic surfactants to deionized water, and the pH value of the aqueous solution was adjusted to 3.2 using formic acid. The resulting aqueous solution was sucked together part of vinyl acetate into an evacuated reactor, into which part of ethylene was passed to ensure that the pressure in the reactor is blow 45 bar. The temperature in the reactor was set to 55° C.

During Polymerization:

When the temperature rose to 55° C. or so, 10 wt % t-butyl hydroperoxide aqueous solution (Feeding 1) and 5 wt % FF6M aqueous solution (Feeding 2) were metered and charged in sequence. When the temperature rose to 85° C. after initiation of the reaction, the remaining vinyl acetate (Feeding 3) and the remaining ethylene (Feeding 4) were sequentially charged.

Post-Polymerization:

After the polymerization was completed, polyacrylamide and, if any, nonionic surfactants, were metered and charged. The resulting product was cooled to about 55° C. and transferred to a downstream degassing tank, into which defoamers were fed, and stirred and left to stand. The mixture's pH value was adjusted to from 4 to 5 with an aqueous solution of sodium hydroxide, and the contents in the degassing tank were then cooled to 20° C. and discharged.

The water-based polymer dispersions obtained therefrom have a solid content of from 55 to 56 wt %.

Table 3 shows initial charge and subsequent feed of each ingredient of the water-based polymer dispersions in Examples 1-6 and Comparative Examples 1-5. The amounts in Table 3 are, unless otherwise specified, in parts by weight. The amount of ethylene used in Table 3 refers to the amount of ethylene gas fed.

Information on Ingredients Referred to in Table 3:

TP-1800. a carboxylated polyacrylamide dispersion, having a solid content of from 29 to 31 wt % and a number average polymer molecular weight of 2×10$^5$ g/mol, supplied by Zhuzhou Rubber Research & Design Institute Co., Ltd. of ChemChina.

Cationic polyacrylamide, having a number average molecular weight of 1×10$^5$ g mol, supplied by Liaocheng Huarun Chemicals Co., Ltd.

Nonionic polyacrylamide, having a number average molecular weight of 1×10$^5$ g/mol, supplied by Liaocheng Huarun Chemicals Co., Ltd.

PVOH 25/88 aqueous solution, having a concentration of 10.3 wt %, prepared from polyvinyl alcohol having an alcoholysis degree of 88 mol % and a viscosity of 25 mPa·s in 4 wt % aqueous solution (20 ° C., DIN 53015).

PVOH 04/88 aqueous solution, having a concentration of 20 wt %, prepared from polyvinyl alcohol having an alcoholysis degree of 88 mol % and a viscosity of 4 mPa·s in 4 wt % aqueous solution (20° C., DIN 53015).

PVOH 117 aqueous solution, having a concentration of 10 wt %, prepared from polyvinyl alcohol having an alcoholysis degree of 99 mol % and a viscosity of 17 mPa·s in 4 wt % aqueous solution (20° C., DIN 53015).

RHODASURF® 6530, an aqueous solution of tridecanol ethoxylate with 30 EO units, having an active ingredient content of from 64 to 66 wt % and an HLB value of 17.2, supplied by Rhodia Solvay Group.

ECOSURF® EH-9, isooctanol polyoxyethylene polyoxypropylene ether with 9 EO units, having an HLB value of 12.5, supplied by DowDupont.

FF6M aqueous solution, a sulfinate reductant, supplied by BrüggemannChemical, Germany.

CorMix AE960N, a hydrophobically modified silica and mineral oil defoamer, supplied by Zhuzhou Rubber Research & Design Institute Co., Ltd. of ChemChina.

Other ingredients and reagents are all commercially available.

TABLE 3

Ingredients of Examples 1-6 and Comparative Examples 1-5 and amounts thereof

| | Composition | Example 1 | Example 2 | Example 3 | Example 4 | Example 5 | Example 6 |
|---|---|---|---|---|---|---|---|
| Prior to the initiation of the polymerization | Ethylene | 13.04 | 13.04 | 13.04 | 13.04 | 13.04 | 13.04 |
| | Vinyl acetate | 57.67 | 57.67 | 57.67 | 57.67 | 57.67 | 57.67 |
| | Deionized water | 43.51 | 43.51 | 43.51 | 43.51 | 43.51 | 43.51 |
| | PVOH 25/88 aqueous solution | 9.04 | 9.04 | 9.04 | 9.04 | 9.04 | 9.04 |
| | PVOH 04/88 aqueous solution | 6.96 | 6.96 | 6.96 | 6.96 | 6.96 | 6.96 |
| | PVOH 117 aqueous solution | 15.22 | 15.22 | 15.22 | / | 15.22 | 15.22 |
| | ECOSURF ® EH-9 | / | / | / | / | / | / |
| | RHODASURF ® 6530 | / | / | / | / | 0.35 | / |
| | 1 wt % aqueous solution of ammonium ferrous sulfete | 0.28 | 0.28 | 0.28 | 0.28 | 0.28 | 0.28 |
| During polymerization | 10 wt % aqueous solution of t-butyl hydroperoxide | 3.82 | 3.82 | 3.82 | 3.82 | 3.82 | 3.82 |
| | 5 wt % aqueous solution of FF6M | 3.82 | 3.82 | 3.82 | 3.82 | 3.82 | 3.82 |
| | Vinyl acetate | 24.70 | 24.70 | 24.70 | 24.70 | 24.70 | 24.70 |
| | Ethylene | 4.59 | 4.59 | 4.59 | 4.59 | 4.59 | 4.59 |
| Post-polymerization | TP1800 | 0.86 | 0.69 | 0.52 | 0.86 | 1.20 | 0.86 |
| | Cationic polyacrylamide | / | / | / | / | / | / |
| | Nonionic polyacrylamide | / | / | / | / | / | / |
| | RHODASURF ® 6530 | 0.35 | 0.35 | 0.35 | 0.35 | / | / |
| | CorMix AE960N | 0.17 | 0.17 | 0.17 | 0.17 | 0.17 | 0.17 |

| | Composition | Comparative Example 1 | Comparative Example 2 | Comparative Example 3 | Comparative Example 4 | Comparative Example 5 |
|---|---|---|---|---|---|---|
| Prior to the initiation of the polymerization | Ethylene | 13.04 | 13.04 | 13.04 | 13.04 | 13.04 |
| | Vinyl acetate | 57.67 | 57.67 | 57.67 | 57.67 | 57.67 |
| | Deionized water | 43.51 | 43.51 | 43.51 | 43.51 | 43.51 |
| | PVOH 25/88 aqueous solution | 9.04 | 9.04 | 9.04 | 9.04 | 9.04 |
| | PVOH 04/88 aqueous solution | 6.96 | 6.96 | 6.96 | 6.96 | 6.96 |
| | PVOH 117 aqueous solution | 15.22 | 15.22 | 15.22 | 15.22 | 15.22 |
| | ECOSURF ® EH-9 | / | / | / | 0.34 | 0.34 |
| | RHODASURF ® 6530 | / | / | / | / | / |
| | 1 wt % aqueous solution of ammonium ferrous sulfete | 0.28 | 0.28 | 0.28 | 0.28 | 0.28 |
| During polymerization | 10 wt % aqueous solution of t-butyl hydroperoxide | 3.82 | 3.82 | 3.82 | 3.82 | 3.82 |
| | 5 wt % aqueous solution of FF6M | 3.82 | 3.82 | 3.82 | 3.82 | 3.82 |
| | Vinyl acetate | 24.70 | 24.70 | 24.70 | 24.70 | 24.70 |
| | Ethylene | 4.59 | 4.59 | 4.59 | 4.59 | 4.59 |
| Post-polymerization | TP1800 | / | / | 0.34 | / | 0.86 |
| | Cationic polyacrylamide | 0.29 | / | / | / | / |
| | Nonionic polyacrylamide | / | 0.29 | / | / | / |
| | RHODASURF ® 6530 | 0.35 | 0.35 | 0.35 | / | / |
| | CorMix AE960N | 0.17 | 0.17 | 0.17 | 0.17 | 0.17 |

Example 7: Type II Polymer Modified Cement-Based Coatings (JS IIs)

According to the formulations as shown in Table 1, the water-based polymer dispersions of Examples 1-6 were respectively used as a liquid ingredient to prepare JS IIs, while those of Comparative Examples 1-5 respectively used to prepare JS IIs as controls.

Table 4 shows the test results for processing viscosity, anti-sagging property, pot life, tensile strength and elongation at break of the JS IIs prepared in Examples 1-6 and Comparative Examples 1-5. As can be seen from the table, the JS IIs prepared from anionic polyacrylamide in Examples 1-6 have excellent anti-sagging property, and the JS IIs prepared in Examples 1-5 have extended pot lives due to the addition of nonionic surfactants (EO 30, HLB 17.2); the JS IIs prepared from cationic or nonionic polyacrylamide in Comparative Examples 1-2 sag; Comparative Example 3, with a relatively low dosage of anionic polyacrylamide, exhibits anti-sagging property slightly inferior to that of the JS IIs in Examples 1-6; and Comparative Examples 4-5, with nonionic surfactants (EO 9, HLB 12.5) added prior to the initiation of the polymerization, show proneness to sagging even when an anionic polyacrylamide is added.

TABLE 4

| | Processing viscosity/ KU | Anti-sagging/ Score | Pot life/ h | Tensile strength/ MPa | Elongation at break/ % |
|---|---|---|---|---|---|
| Standard requirements of JS II | / | / | / | ≥1.8 | ≥80 |

TABLE 4-continued

| | Processing viscosity/ KU | Anti-sagging/ Score | Pot life/ h | Tensile strength/ MPa | Elongation at break/ % |
|---|---|---|---|---|---|
| Example 1 | 107 | 5 | >4 h | 2 | 146 |
| Example 2 | 100 | 5 | >4 h | 2.06 | 165 |
| Example 3 | 100 | 5 | >4 h | 2.12 | 160 |
| Example 4 | 98 | 5 | >4 h | 1.96 | 184 |
| Example 5 | 110 | 5 | >4 h | N/A | N/A |
| Example 6 | 125 | 5 | <2 h | N/A | N/A |
| Comparative Example 1 | 85 | 1 | N/A | N/A | N/A |
| Comparative Example 2 | 90 | 1 | N/A | N/A | N/A |
| Comparative Example 3 | 100 | 4 | N/A | N/A | N/A |
| Comparative Example 4 | 120 | 2 | >4 h | 1.4 | 190 |
| Comparative Example 5 | 112 | 2 | >4 h | 1.56 | 170 |

Example 8: Type I Polymer Cement Coating

According to the formulations as shown in Table 1, the water-based polymer dispersion of Examples 1 was used as a liquid ingredient to prepare a JS I. Table 5 shows the test results for processing viscosity, anti-sagging performance, pot life, tensile strength and elongation at break of the JS I.

TABLE 5

| | Processing viscosity/ KU | Anti-sagging/ Score | Pot life/ h | Tensile strength/ MPa | Elongation at break/ % |
|---|---|---|---|---|---|
| Standard requirements of JS I | / | / | / | ≥1.2 | ≥200 |
| Example 1 | 102 | 5 | >4 h | 1.73 | 335 |

What is claimed is:

1. An aqueous polymer dispersion, comprising:
   i) a copolymer prepared by the polymerization of comonomers comprising a vinyl ester and ethylene,
   ii) an anionic polyacrylamide,
   iii) a polyvinyl alcohol, and
   iv) water,
   wherein the anionic polyacrylamide is present in an amount of at least 0.15 wt. %, based on the total weight of the vinyl ester and ethylene monomers.

2. The aqueous polymer dispersion of claim 1, wherein the anionic polyacrylamide is present in an amount of 0.15 to 0.45 wt. %.

3. The aqueous polymer dispersion of claim 1, wherein further comonomers are polymerized in an amount of less than 5 wt % based on the total weight of the vinyl ester and ethylene monomers.

4. The aqueous polymer dispersion of claim 1, wherein the number average molecular weight of the anionic polyacrylamide is from $1 \times 10^5$ to $1 \times 10^7$ g/mol.

5. The aqueous polymer dispersion of claim 1, wherein the aqueous polymer dispersion further comprises a nonionic surfactant with an HLB value of from 13 to 20.

6. The aqueous based polymer dispersion of claim 5, wherein the nonionic surfactant are $C_4$-$C_{40}$ alkyl alcohol ethoxylates having 10 to 60 EO units.

7. The aqueous polymer dispersion of claim 5, wherein the nonionic surfactants are present in an amount of from 0.2 to 0.8 wt %, based on the total weight of the vinyl ester and ethylene monomers.

8. The aqueous polymer dispersion of claim 1, wherein the polyvinyl alcohol comprises at least one medium molecular weight polyvinyl alcohol and at least one low molecular weight polyvinyl alcohol, wherein the medium molecular weight polyvinyl alcohol is a polyvinyl alcohol having a Hoppler viscosity, in 4 wt % aqueous solution, of from 10 to 35 mPa·s as measured at 20° C. according to DIN 53015, and
   the low molecular weight polyvinyl alcohol is a polyvinyl alcohol having a Hoppler viscosity, in 4 wt % aqueous solution, of from 3 to less than 10 mPa·s as measured at 20° C. according to DIN 53015.

9. The aqueous polymer dispersion of claim 8, wherein the medium molecular weight polyvinyl alcohol comprises a first medium molecular weight polyvinyl alcohol and a second medium molecular weight polyvinyl alcohol,
   wherein the first medium molecular weight polyvinyl alcohol has a Hoppler viscosity, in 4 wt% aqueous solution, of from 20 to 30 mPa·s as measured at 20° C. according to DIN 53015, and
   the second medium molecular weight polyvinyl alcohol has a Hoppler viscosity, in 4 wt % aqueous solution, of from 10 to less than 20 mPa·s as measured at 20° C. according to DIN 53015.

10. The aqueous polymer dispersion of claim 8, wherein the mass ratio of the medium molecular weight polyvinyl alcohol to the low molecular weight polyvinyl alcohol is 0.6 to 2.5:1.

11. The aqueous polymer dispersions of claim 8, wherein the polyvinyl alcohol is present in an amount of from 2 to 8 wt %, based on the total weight of the vinyl ester and ethylene monomers.

12. The aqueous polymer dispersion of claim 1, wherein the anionic polyacrylamide is added after the polymerization is completed.

13. The aqueous polymer dispersion of claim 5, wherein the mass ratio of the nonionic surfactant to the anionic polyacrylamide is 0.5 to 1.5:1 when the nonionic surfactant is added after the polymerization is completed, and
   the mass ratio of the nonionic surfactant to the anionic polyacrylamide is 0.3-1.2:1 when the nonionic surfactant is added prior to the initiation of the polymerization.

14. The aqueous polymer dispersion of claim 8, wherein all polyvinyl alcohols are added prior to the initiation of the polymerization.

15. A polymer modified cement-based coating containing an aqueous polymer dispersion of claim 1.

16. A polymer modified cement composition comprising liquid and powder components, characterized in that the liquid component comprises an aqueous polymer dispersion of claim 1.

* * * * *